(12) United States Patent
Marobin

(10) Patent No.: US 6,192,297 B1
(45) Date of Patent: Feb. 20, 2001

(54) METHOD FOR HANDLING METAL SHEETS IN A WORKING AREA COMPRISING A MACHINE TOOL AND A ROBOT

(75) Inventor: Mario Marobin, Campiglia dei Berici (IT)

(73) Assignee: Salvagnini Italia S.p.A., Sarego (IT)

( * ) Notice: Under 35 U.S.C. 154(b), the term of this patent shall be extended for 0 days.

(21) Appl. No.: 08/932,544

(22) Filed: Sep. 17, 1997

(30) Foreign Application Priority Data

Sep. 18, 1996 (IT) ................................. MI96A1912

(51) Int. Cl.$^7$ ..................................... G06F 19/00
(52) U.S. Cl. ......................... 700/245; 700/97; 700/103; 700/104; 700/165; 700/243; 29/17.1; 59/6; 59/7; 59/72; 59/73; 59/74; 59/75; 59/76; 59/77; 72/190; 72/420; 72/422
(58) Field of Search .............................. 72/319, 190, 316, 72/422, 239, 379.2, 420; 29/17.1, 897.312; 59/6, 7, 13, 74, 72, 73, 75, 91; 294/16; 413/18; 700/97, 104, 165, 243

(56) References Cited

U.S. PATENT DOCUMENTS

| | | | | |
|---|---|---|---|---|
| 3,881,382 | * | 5/1975 | Rasenberger et al. | 83/305 |
| 5,188,135 | * | 2/1993 | Neumann et al. | 134/64 R |
| 5,307,282 | | 4/1994 | Conradson et al. | 700/103 |
| 5,380,055 | * | 1/1995 | Suarez | 294/16 |
| 5,761,951 | * | 6/1998 | Codatta | 72/420 |
| 5,822,207 | * | 10/1998 | Hazama et al. | 700/97 |

FOREIGN PATENT DOCUMENTS

| | | |
|---|---|---|
| 0 355 454 | 2/1990 | (EP) . |
| 0 355 454 A2 | 2/1990 | (EP) . |
| 2 211 002 | 6/1989 | (GB) . |
| 2211 002 A | 6/1989 | (GB) . |
| WO 91 08869 | 6/1991 | (WO) . |
| WO 91/08869 | 6/1991 | (WO) . |
| WO 91 10180 | 7/1991 | (WO) . |
| WO 91/10180 | 7/1991 | (WO) . |
| WO 96 14967 | 5/1996 | (WO) . |
| WO 96/14967 | 5/1996 | (WO) . |
| WO 96/15481 | 5/1996 | (WO) . |
| WO96 15481 | 5/1996 | (WO) . |

OTHER PUBLICATIONS

Peisen et al., "Adaptive Learning Control Scheme for Manipulators", IEEE., pp. 375–379, 1992.*
Clement et al., "An Instructional Robotics and Machine Vision Laboratory", IEEE. pp. 87–90, Feb. 1994.*
Smith et al., "Computer Vision Control of an Underwater Manipulator", IEEE, pp. I/87–I/92, 1994.*
A Learning Man–Machine Interface For an Artificial Arm, IEEE. pp. 227–230, 1991.*
Luecke et al., "Virtual Cooperating Manipulators as a Virtual Reality Haptic Interface", IEEE. pp. 133–140, 1996.*

* cited by examiner

*Primary Examiner*—William Grant
*Assistant Examiner*—McDieunel Marc
(74) *Attorney, Agent, or Firm*—Nixon & Vanderhye, P.C.

(57) ABSTRACT

A method for moving metal sheets of a working area by an antropomorphous robot comprises a) taking of preselected fixed input data that identify the geometry in the space of components of a working island; b) taking, comprising from a machine tool, preselected variable input data comprising dimensions and shape of a preselected metal sheet to be handled and a sequence of working preselected metal sheets; c) processing the fixed and variable input data on a processing unit in order to generate automatically output data that identify a preselected trajectory of the metal sheet to be handled and d) transfer the output data to a control unit of the robot in order to drive said robot to move the metal sheet along the preselected trajectory so as to handle said metal sheets selected by type.

32 Claims, 2 Drawing Sheets

METHOD FOR HANDLING METAL SHEETS IN A WORKING AREA COMPRISING A MACHINE TOOL AND A ROBOT

This application is based on application No. MI96 A001912 filed in Italy, the content of which is incorporated hereinto by reference.

FIELD OF THE INVENTION BACKGROUND

The present invention relates to a method for handling metal sheets in a working area comprising a machine tool and a robot, with automatic generation of trajectories.

RELATED ART AND OTHER CONSIDERATIONS

Modern flexible manufacturing systems (FMS) are known for working metal sheets, (such as punching/shearing, bending and the like), that allow the production of unitary lots of finished metal sheets (pieces) with a proven technology consisting of "nesting", that is, the optimised jointing of individual sheets. Using such technology, a working cycle of a numerically-controlled (NC) machine tool of a working area is has a program generated by the fusion of individual programs for numerical control inserted in casual sequence and processed so as to minimise the quantity of scrap resulting from the working process. In this way high flexibilities are obtained for pieces having arbitrary shapes and dimensions, produced at rates that range from a few seconds to some minutes.

In modern working areas, in order to feed the metal sheets to the machine tool and in order to collect and stack the finished pieces, an antropomorphous robot can be used instead of or in addition to traditional devices. The antropomorphous robot is provided with an arm having a plurality of rotational joints and one or more sliding joints. Preferably, the rotational joints are five or more than five. The robot antropomorphous allows an easy handling of the metal sheets, especially if they have shapes and dimensions that are not very suitable for conventional handling.

The trajectories required for handling metal sheets have shapes that are known and that can be expressed by just a few cases. However, the trajectories become an infinite set because, in relation to the casuality and to the flexibility of production, the initial and final points of the path vary continuously.

In order to set up the trajectories for handling the metal sheets a "self-learning" procedure is commonly used. In this "self-learning" procedure, operator, by operating a pendant control, guides the robot to execute the desired trajectory or evolution in space. The path executed in this way is memorised in a control unit of the robot for use in an autonomous manner (i.e.) without the intervention of the operator at a later time, for the handling of the metal sheets from a feeding site to the machine tool and/or from the machine tool to an unloading site.

The self-learning method greatly reduces the flexibility of the working area. In particular, if the production lots are unitary, flexibility becomes nil due to the fact that the self-learning process performed for each individual piece of a unitary lot is not used again.

Generally, the manufacturers of robots provide a programming language for the sequences of actions to be performed and a self-learning method for the initialisation of data that can be used for very generic applications. The adaptation of the sequences and of the data to a specific working cycle requires times that, in the case of punching and/or shearing or bending operations, range from thirty to three hundred minutes and up. These are very long times if compared to those required for the automatic creation of programs for numerical control by means of the "nesting" technology. In fact, "nesting" for several hours of production takes only a few minutes for the generation of the programs, starting from the ones that exist for the individual pieces. Thus, the times of the self-learning step translate into a "downtime", (i.e., a loss of flexibility) that is very costly in the case of punching/shearing or panelling (bending) machines used, as is often the case, for the production of small lots.

The self-learning procedure also requires particular competences on the part of the operator, but this kind of specialisation is often missing in small firms or, in any case, its possible presence involves a further increase in costs.

Moreover, the self-learning procedure also involves problems of safety because it has to be performed within the field of action of the robot. In fact, in order to initialise the robot, an operator has at his disposal a portable keyboard (teach pendant or control by wire). However, in order to move the robot to the required working positions with adequate accuracy and to check that it does actually take up the pre-established final positions with respect to the machine tool, the operator is generally obliged to inspect at very close range the positions actually assumed by the robot. This takes the operator within the field of action of components in motion and, thus, in conditions of serious danger.

An object of the present invention is a method for moving metal sheets in a working area comprising a machine tool and a robot that allows the above-mentioned drawbacks to be overcome, accomplishing a handling operation of metal sheets selected by type and totally eliminating the steps of self-learning and of changing the operative sequences of the robot every time the type of metal sheets to be handled is changed.

SUMMARY

The above-mentioned object is achieved, according to the invention, with a method for moving metal sheets in a space of a working area comprising a machine tool, at least a robot, a site for feeding the metal sheets to be worked and a site for unloading the finished metal sheets, said machine tool, robot and feeding and unloading sites having each a prefixed shape and a prefixed geometric position in the space of said working area, said robot being provided with an arm and with a grasping member capable of taking said metal sheets and being operatively connected to a control unit, characterized in that (i) said robot (101) is antropomorphous and (ii) for handling said metal sheets (104)

a) preselected fixed input data are detected consisting of configuration parameters that identify the geometry in the space of said machine tool, robot and at least one of said feeding and unloading sites whithout resorting to CAD tecniques;

b) preselected variable input data are detected from said machine tool consisting of
dimensions of a preselected metal sheet to be handled,
shape of said metal sheet to be handled,
sequence of working of preselected metal sheets, whithout resorting to CAD techniques;

c) the above-mentioned fixed and variable input data are processed on a processing unit by an algorithm based on the solutions of the inverse kinematics in order to generate automatically output data that identify a preselected trajectory of said metal sheet between one of said feeding and unloading sites and said machine tool and d) said output data are transferred to said control unit of said robot in order to drive said robot to move said metal sheet along said preselected trajectory so as to automatically handle said metal sheets selected by type.

One of the main advantages of the method according to the invention is the increase in flexibility derived from the possibility of handling the metal sheets selected by type without making recourse to the self-learning procedure and to sophisticated and costly methodologies such as CAD (Computer-Aided-Design) methodologies, artificial intelligence methodologies and expert systems.

Another important advantage is the improvement in safety, it being no longer necessary to operate within the field of action of the components in motion of the working area.

Other advantages are represented by the accuracy, efficiency and reliability of the working cycles of the antropomorphous robot generated with the method of the invention.

BRIEF DESCRIPTION OF THE DRAWINGS

Features and advantages of the invention will now be illustrated with reference to an embodiment represented, as a non-limiting example, in the enclosed drawings, wherein.

DETAILED DESCRIPTION

Figure 1:
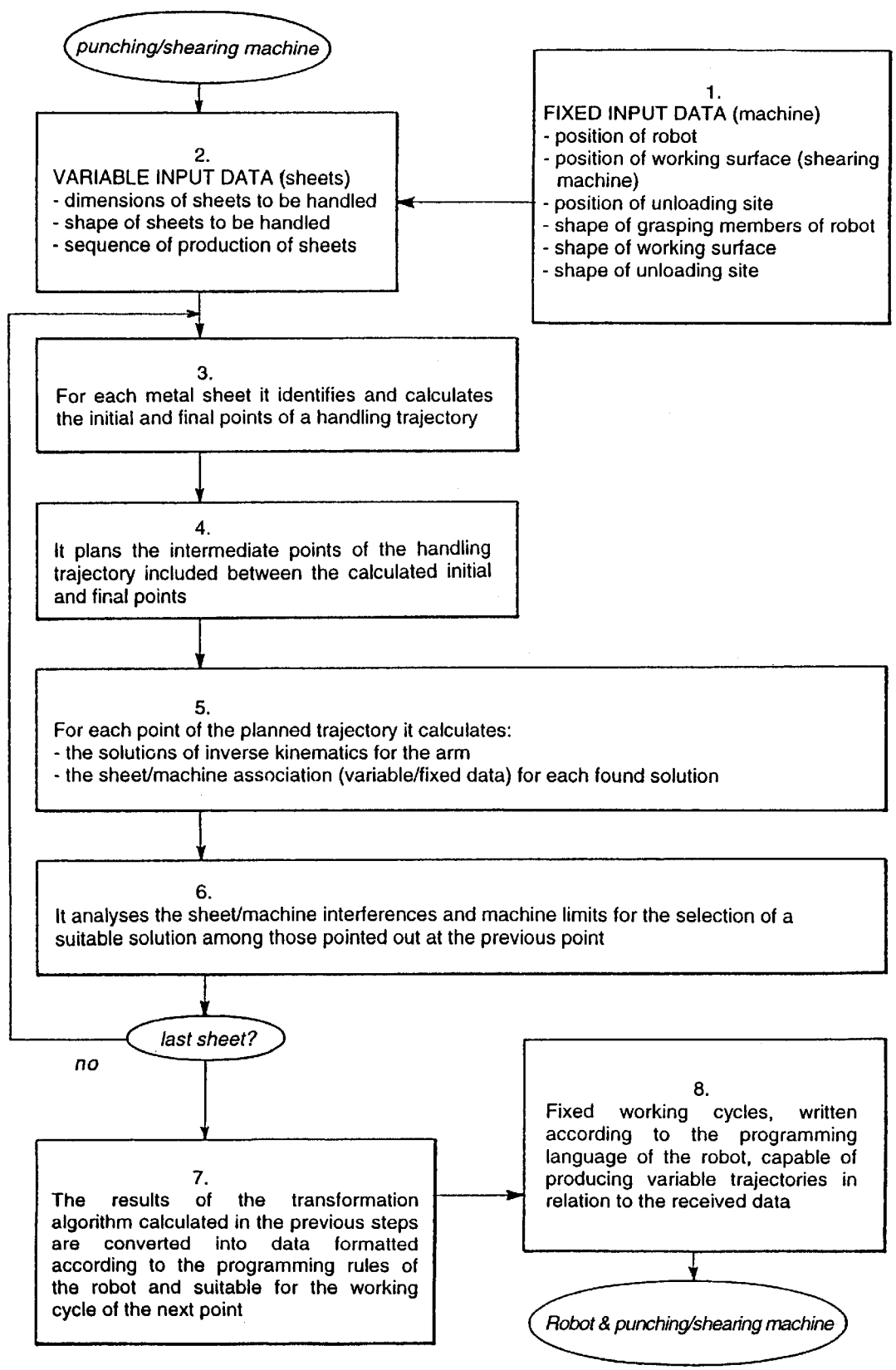
FIG. 1 shows a functional diagram of a method for handling metal sheets in a working area comprising a machine tool and an antropomorphous robot, made according to the invention.
Figure 2:
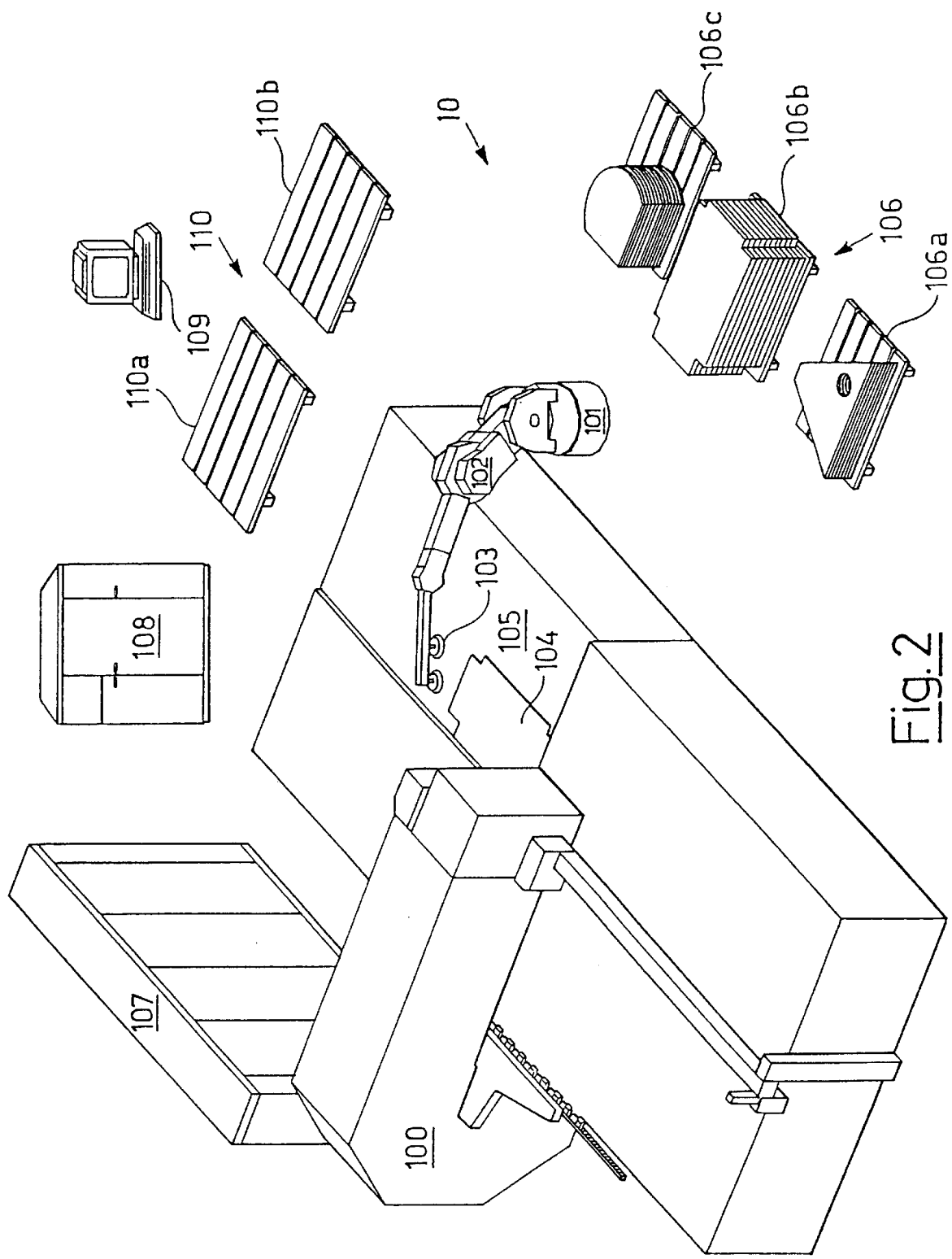
FIG. 2 is a schematic representation of a working area comprising a machine tool and antropomorphous robot capable of operating according to the method of the invention.

FIG. 1 shows a functional diagram of a method for handling metal sheets in a working area (working cell), like area 10 in FIG. 2. The area 10 comprises a machine tool 100 operatively connected to a processing/control unit 107, an antropomorphous robot 101 operatively connected to a control unit 108, a site 110 for feeding metal sheets to be worked and a site 106 for unloading the worked metal sheets.

The machine tool 100 comprises of a punching/shearing machine provided with a working surface 105 supporting the metal sheets being worked. The machine tool 100 can be of another type, for example a bending machine or the like. The antropomorphous robot 101 consists of an arm 102 and grasping members 103 (suction cups, device for grasping mechanically, pneumatically, magnetically or the like). The antropomorphous robot 101 is capable of withdrawing the worked metal sheets 104 from the working surface 105 and placing them, selected by type and stacked, on a preselected support surface 106a or 106b or 106c of the unloading site 106 that is situated within the field of action of the robot 101.

The working area 10 also comprises an auxiliary processing unit 109 comprising, for example, a personal computer or a workstation, having functionalities that will be illustrated later. The auxiliary processing unit 109 and the control unit of the robot 108 can be incorporated, physically and functionally, in the sole processing/control unit 107 of the punching/shearing machine 100.

Usual accessories for feeding, unloading and stacking the metal sheets, that also can be inserted to complete the working area 10, are not shown. Likewise, there is also not shown a second robot that can be used for handling the metal sheets to be worked, selected by type, from a support surface 110a or 110b of the feeding site 110 to the working surface 105 of the punching/shearing machine 100.

The method for moving of the present invention is applied to the antropomorphous robot 101 in order to execute the unloading of the worked metal sheets 104 from the surface 105 and to stack them, selected by type, in the unloading site 106. The method for moving, illustrated in FIG. 1, is based on a program (software algorithm) written in a preselected programming language and compiled and/or interpreted in a project computer, not shown. An executable program is obtained that is loaded into the data processing unit 109 of FIG. 2.

The method provides for an initial step of configuration of the working area 10 (block 1 in FIG. 1) consisting in the detection of parameters that identify the geometry in the space of components that, in the case exemplified, are the antropomorphous robot 101, its grasping members 103, the working surface 105 of the punching/shearing machine 100 and the unloading site 106. Some parameters comprise of data of position and they represent the description of the world surrounding the antropomorphous robot 101 in the form of oriented Cartesian terms (X, Y, Z, O, A, T), where (X, Y, Z) are the coordinates of the origin of the tern and (O, A, T) are the Euler angles that define the orientation of the tern in the space. Other parameters consist of data of the shape of the components of the working area and comprise, for example, of the lengths the arms of the robot, the dimensions of its grasping members and other data. In the case exemplified, the configuration parameters considered (block 1) comprise position of the robot 101, position of the working surface 105, position of a support surface 106a or 106b or 106c of the unloading site 106, shape of the robot 101 and of its grasping members 103, shape of the working surface 105, shape of a support surface 106a or 106b or 106c of the unloading site 106.

The configuration parameters indicated earlier constitute fixed input data because they are independent from the form and dimensions of the metal sheets 104 to be handled. They are inserted or connected in a permanent manner in the executable program resident in the data processing unit 109.

The method also comprises a step of acquisition of variable input data (block 2) in the data processing unit 109 (FIG. 2). Such variable input data comprises dimensions of a preselected metal sheet to be handled, shape of said metal sheet to be handled, sequence of production of preselected metal sheets.

The above-mentioned variable input data are acquired automatically by operating programs of the punching/shearing machine 100; the step of data acquisition can be completed with the possible addition of other data comprising preferences of stacking on the support surfaces 106a, 106b, 106c of the unloading site 106.

In the absence of this last data it is possible to proceed with stacking positions calculated automatically in relation to the available data.

The above-mentioned variable input data comprises information available in any case in the processing/control unit of the punching/shearing machine for the operation of the working area. Any procedure suitable for extracting this information is capable of defining the above-mentioned variable input data and can be used for the purpose of the present invention.

For each preselected metal sheet a logic/decisional algorithm establishes the initial and final points of the trajectory that the grasping members 103 of the robot 101 must perform to execute the required handling operation from the working surface 105 to a preselected support surface 106a or 106b or 106c of the unloading site 106 (block 3). The algorithm completes the trajectory with a series of intermediate points between the extremities calculated in this way, planned so as to constrain the robot to move along pre-established paths (block 4). The "point", in this context, is a manner for representing an oriented Cartesian tern in the space and the "points" of the trajectory assume values and are sufficient in number for the motion of the robot, between two successive points, to be predictable and within the field of action of its arm.

The method provides, for each "point" of a trajectory planned in this manner, the calculation of (block 5):
  solutions of inverse kinematics for the arm of the robot,
  sheet/machine association (variable/fixed data) for each solution that has been found.

Inverse kinematics is a mathematical transformation that places an oriented tern of Euclidean space (X, Y, Z, O, A, T) in relation to a set of vectors $Z1, Z2, Z3 \ldots, Zn$. Each vector $Zi$ has as many components as there are axes of the robot; each component represents the linear (millimeters) or angular (degrees) position that each axis can assume in order to reach the "point" (X, Y, Z, O, A, T). The described transformation is known to the person skilled in the art as "solution to the problem of inverse kinematics". For each point k ($k=1, 2, 3, \ldots, k'$) of the planned trajectory the n ($n=0, 1, 2, \ldots, n'$) solutions found are associated with each of them the shape of the metal sheet being handled are identified; the $k' \times n'$ spatial representations of the robot+sheet set are thus calculated for each trajectory.

The method comprises a step of analysis of the sheet/machine interferences (block 6) for the selection of a suitable solution among those advanced in the preceding step. Particularly, interferences sheet/robot, sheet/machine tool, sheet/support surfaces are examined. This step is executed by a logical-mathematical algorithm that automatically identifies the most suitable solution, among the calculated representations, so as to eliminate the solutions that involve sheet/machine interferences, any out-of-strokes of the axes of the robot axes and improper rotations (0° and 0°±360°) of the axes from one point to the next.

As an alternative to the automatic procedure just described, a simplified and ergonomic graphic representation can be used that is capable of effectively visualising the sheet/machine interferences, the out-of-strokes and the improper rotations of the axes so as to select quickly (a few seconds), for all the points of the trajectory, the most suitable solution among those calculated for each point. This second (interactive) procedure can also be used for a quick visual check on the selections executed automatically by the first procedure.

With reference to FIG. 1, the steps identified by the blocks 3 and 4 for planning the trajectory and by the blocks 5 and 6 for determining the suitable solution, are repeated for each metal sheet described in the sequence of production of the variable input data (block 2).

The method also provides for a step of generating variable output data (block 7) in a programming language specific to the control unit 108 of the robot 101. The results of the decisional and calculation algorithms described earlier are converted into output data valid for driving the robot 101 according to the syntax rules of its specific programming language. The converted data are the position vectors for the axes of the robot and a list with the sequence of the cycles to be executed.

The method is completed with a step of generating final output data (block 8) in the form of working cycles of the robot. The final output data consist of a set of elementary cycles, required for executing the physical movement of the robot synchronised with the punching/shearing machine, written according to the syntax rules of the programming language of the specific robot and specifically designed to receive the variable output data described earlier (block 7). The combination of the elementary cycles built-up in this way and of the variable output data allows the handling operation of the metal sheets produced through the robot 101 enslaved to the punching/shearing machine 100 to be obtained automatically.

With the method of the invention, when the program generated in the project computer is to be transferred to the working area 10 it is sufficient to detect the values of the geometric positions in the space of the components of the specific working area (calibration) and to insert them into the program itself.

The result is a customised software algorithm, of the executable type, that, once installed in the data processing unit 109 of the working area 10, is capable of acquiring the variable input data described earlier (block 2) and of providing at output the variable data (block 7) and the working cycles of the robot (block 8) for the automatic handling operations of the metal sheets associated with the production of the punching/shearing machine 100.

The variable data and the cycles of blocks 7 and 8 are transferred from the processing unit 109 to the control unit 108 of the robot 101 for the immediate execution of the required work.

From the above description it appears clearly that the method described confers total flexibility on the working area because the manual step of defining the handling trajectory of the robot via self-learning procedure has been eliminated. The auxiliary processing unit 109 and the control unit of the robot 108 can be incorporated, physically and functionally, in the sole processing/control unit 107 of the punching/shearing machine 100.

A similar method for moving can be applied to a second robot in the working area 10 for taking from the support surfaces 110a and 110b of the feeding site 110 the metal sheets to be worked, selected by type, and placing them on the working surface 105.

What is claimed is:
1. A method for moving metal sheets in a space of a working area comprising a machine tool, at least a robot, a site for feeding the metal sheets to be worked and a site for unloading the finished metal sheets, said machine tool, robot and feeding and unloading sites having each a prefixed shape and a prefixed geometric position in the space of said working area, said robot being provided with an arm and with a grasping member capable of taking said metal sheets and being operatively connected to a control unit,
  characterized in that (i) said robot is antropomorphous and (ii) for handling said metal sheets the following steps are performed:
  a) preselected fixed input data are detected comprising configuration parameters that identify the geometry in the space of said machine tool, said robot, and at least one of said feeding and unloading sites without resorting to CAD techniques;

b) preselected variable input data are detected from said machine tool comprising
    dimensions of a preselected metal sheet to be handled,
    a shape of said metal sheet to be handled,
    a sequence of working of preselected metal sheets, without resorting to CAD techniques;
c) the above-mentioned fixed and variable input data are processed on a processing unit by an algorithm based on the solutions of the inverse kinematics in order to generate automatically output data that identify a preselected trajectory of said metal sheet between one of said feeding and unloading sites and said machine tool, the preselected trajectory comprising an initial point and a final point and intermediate points, and for each point k (1, 2, 3, . . . k') the solutions of the inverse kinematics are found; and
d) said output data are transferred to said control unit of said robot in order to drive said robot to move said metal sheet along said preselected trajectory so as to automatically handle said metal sheets selected by type.

2. A method for moving according to claim 1, characterized in that said fixed input data comprise a prefixed position of said robot.

3. A method for moving according to claim 1, characterized in that said fixed input data comprise shape of said robot and of a grasping member thereof.

4. A method for moving according to claim 1, characterized in that said fixed input data comprise a prefixed position of a working surface of said machine tool.

5. A method for moving according to claim 1, characterized in that said fixed input data comprise a prefixed shape of said working surface of said machine tool.

6. A method for moving according to claim 1, characterized in that said fixed input data comprise a prefixed position of a support surface of said unloading site.

7. A method for moving according to claim 1, characterized in that said fixed input data comprise a prefixed shape of said support surface of said unloading site.

8. A method for moving according to claim 1, characterized in that said fixed input data comprise a prefixed position of a support surface of said feeding site.

9. A method for moving according to claim 1, characterized in that said fixed input data comprise a prefixed shape of said support surface of said feeding site.

10. A method for moving according to claim 1, characterized in that for each point of said planned trajectory, calculations are made of:
    solutions of inverse kinematics for the arm of said robot,
    sheet/machine association by means of said variable and fixed data for each solution that has been found.

11. A method for moving according to claim 10, characterized in that it comprises a step of analysis of the interferences between said metal sheet and said robot for the automatic selection of a suitable solution among those found.

12. A method for moving according to claim 11, characterized in that it comprises a step of generating variable output data wherein the results of said decisional and calculation algorithms are converted into variable output data in a programming language specific to said control unit of said robot.

13. A method for moving according to claim 12, characterized in that it comprises a step of generating final output data wherein output data are generated in the form of fixed working cycles, written according to the specific language of said control unit of said robot capable of producing trajectories that are variable in relation to the received data.

14. A method for moving according to claim 10, characterized in that it comprises a step of graphic representation capable of visualising sheet/machine interferences, out-of-strokes and improper rotations of the axes of said robot so as to select, for all the points of said trajectory, the most suitable solution among those calculated for each point.

15. A method for moving according to claim 1, wherein said robot has at least five degrees of freedom.

16. A robot for handling metal sheets in a space of a working area comprising a machine tool, a site for feeding the metal sheets to be worked and a site for unloading the finished metal sheets, said machine tool, robot and feeding and unloading sites having each a prefixed shape and a prefixed geometric position in the space of said working area, said robot being provided with an arm and with a grasping member capable of taking said metal sheets and being operatively connected to a control unit,
    characterized in that (i) said robot is antropomorphous and (ii) said control unit is capable of operating according to a method for moving wherein, for preselected metal sheets to be handled, the following steps are performed:
    a) preselected fixed input data are detected comprising configuration parameters that identify the geometry in the space of said machine tool, said robot, and at cast one of said feeding and unloading sites without resorting to CAD techniques;
    b) preselected variable input data are detected from said machine tool comprising
       dimensions of a preselected metal sheet to be handled,
       a shape of said metal sheet to be handled,
       a sequence of working of preselected metal sheets, without resorting to CAD techniques;
    c) the above-mentioned fixed and variable input data are processed on a processing unit by an algorithm based on the solutions of the inverse kinematics in order to generate automatically output data that identify a preselected trajectory of said metal sheet between one of said feeding and unloading sites and said machine tool, the preselected trajectory comprising an initial point and a final point and intermediate points, and for each point k (1, 2, 3, . . . k') the solutions of the inverse kinematics are found; and
    d) said output data are transferred to said control unit of said robot in order to drive said robot to move said metal sheet along said preselected trajectory so as to automatically handle said metal sheets selected by type.

17. A robot according to claim 16, characterized in that said fixed input data comprise a prefixed position of said robot.

18. A robot according to claim 16, characterized in that said fixed input data comprise shape of said robot and of a grasping member thereof.

19. A robot according to claim 16, characterized in that said fixed input data comprise a prefixed position of a working surface of said machine tool.

20. A robot according to claim 16, characterized in that said fixed input data comprise a prefixed shape of said working surface of said machine tool.

21. A robot according to claim 16, characterized in that said fixed input data comprise a prefixed position of a support surface of said unloading site.

22. A robot according to claim 16, characterized in that said fixed input data comprise a prefixed shape of said support surface of said unloading site.

23. A robot according to claim 16, characterized in that said fixed input data comprise a prefixed position of a support surface of said feeding site.

24. A robot according to claim 16, characterized in that said fixed input data comprise a prefixed shape of said support surface of said feeding site.

25. A robot according to claim 16, characterized in that for each point of said planned trajectory, calculations are made of:
   solutions of inverse kinematics for the arm of said robot,
   sheet/machine association by means of said variable and fixed data for each solution that has been found.

26. A robot according to claim 25, characterized in that it comprises a step of analysis of the interferences between said metal sheet and said robot for the automatic selection of a suitable solution among those found.

27. A robot according to claim 26, characterized in that it comprises a step of generating variable output data wherein the results of said decisional and calculation algorithms are converted into variable output data in a programming language specific to said control unit of said robot.

28. A robot according to claim 27, characterized in that it comprises a step of generating final output data wherein output data are generated in the form of fixed working cycles, written according to the specific language of said control unit of said robot, capable of producing trajectories that are variable in relation to the received data.

29. A robot according to claim 25, characterized in that it comprises a step of graphic representation capable of visualising sheet/machine interferences, out-of-strokes and improper rotations of the axes of said robot so as to select, for all the points of said trajectory, the most suitable solution among those calculated for each point.

30. A robot according to claim 16, characterized in that said method for moving is loaded in a processing unit in the form of executable program.

31. A robot according to claim 30, characterized in that said control unit and said processing unit are physically and functionally incorporated in a processing/control unit of said machine tool.

32. A robot according to claim 16, wherein said robot has at least five degrees of freedom.

* * * * *